May 16, 1961 F. W. LIVERMONT 2,984,133
TORQUE LIMITING SCREW DRIVER
Filed June 23, 1958 2 Sheets-Sheet 1
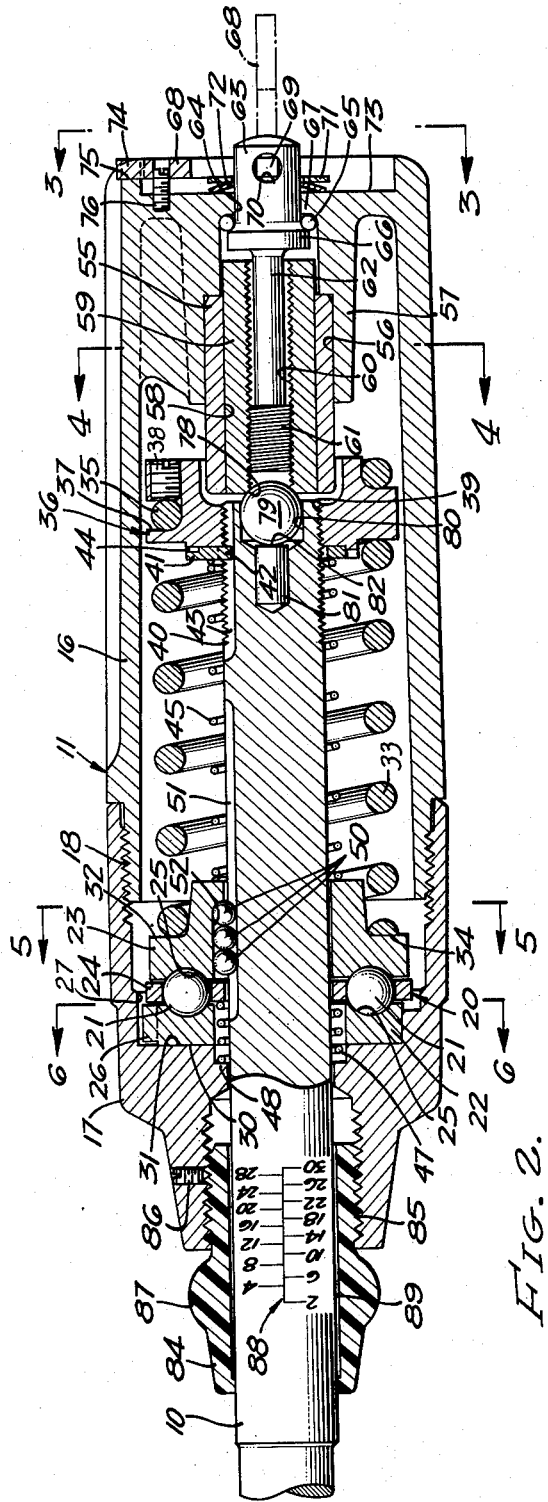
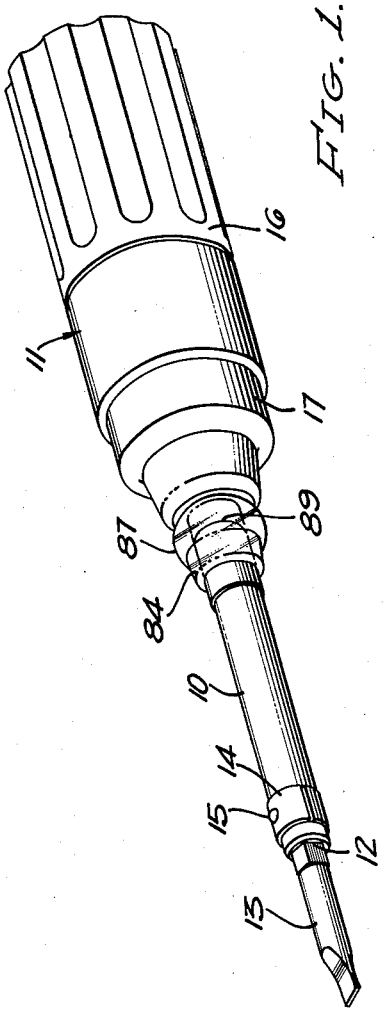
FRANK W. LIVERMONT
INVENTOR.
BY Lyon＆Lyon
ATTORNEYS May 16, 1961 F. W. LIVERMONT 2,984,133
TORQUE LIMITING SCREW DRIVER
Filed June 23, 1958 2 Sheets-Sheet 2

FRANK W. LIVERMONT
INVENTOR.

BY Lyon & Lyon
ATTORNEYS

United States Patent Office 2,984,133
Patented May 16, 1961

2,984,133

TORQUE LIMITING SCREW DRIVER

Frank W. Livermont, Duarte, Calif. (% Livermont, Inc., 922 S. Myrtle Ave., Monrovia, Calif.); Milford S. Zimmerman, executor of the estate of Frank W. Livermont, deceased Filed June 23, 1958, Ser. No. 743,650

7 Claims. (Cl. 81—52.4)

This invention relates to torque limiting tools of the type used for installing and connecting threaded fasteners, and is particularly directed to improvements over the apparatus disclosed in my prior Patent 2,732,746, granted January 31, 1956.

It is the principal object of this invention to provide an improved torque limiting tool of this general type which may readily be adjusted to produce accurate torque release settings over an exceptionally wide range.

Another object is to provide an improved form of torque limiting tool having novel means for indicating the torque setting of the tool.

Another object is to provide a torque limiting tool having an improved mounting for the load spring and having improved adjusting means for changing the force applied to it.

Another object is to provide a torque limiting tool having improved action at low torque values.

Another object is to provide a torque limiting tool employing a series of balls positioned between axially separable dimple plates, one of the dimple plates being slidable but non-rotatable with respect to a driven member and the other dimple plate having limited rotational movement with respect to an enclosing driving member.

Other and more detailed objects and advantages will appear hereinafter.

In the drawings:

Figure 1 is a perspective view showing a preferred embodiment of my invention.

Figure 2 is a longitudinal sectional elevation on an enlarged scale.

Figure 3:
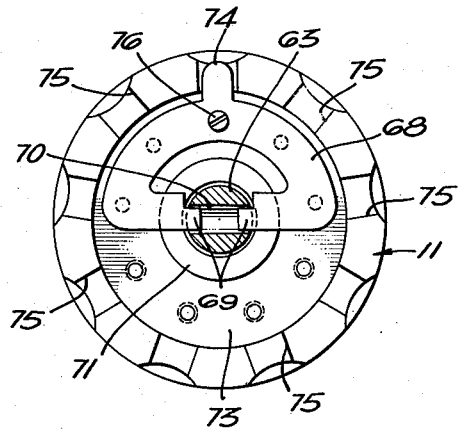
Figure 3 is an end view taken substantially on the lines 3—3 as shown in Figure 2.
Figure 4:
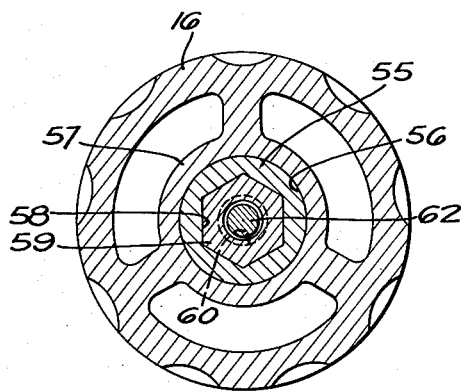
Figure 6:
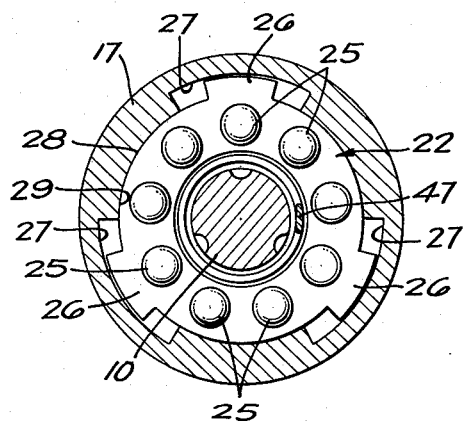
Figure 5:
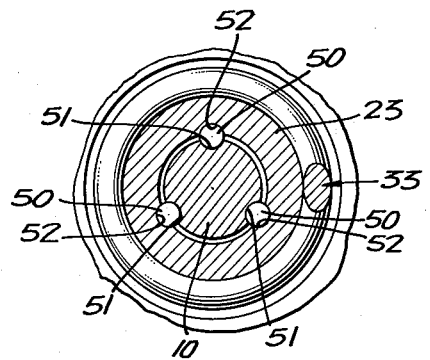

Figures 4, 5 and 6 are transverse sectional elevations taken substantially on the lines 4—4, 5—5 and 6—6 respectively, as shown in Figure 2.

Figure 7:
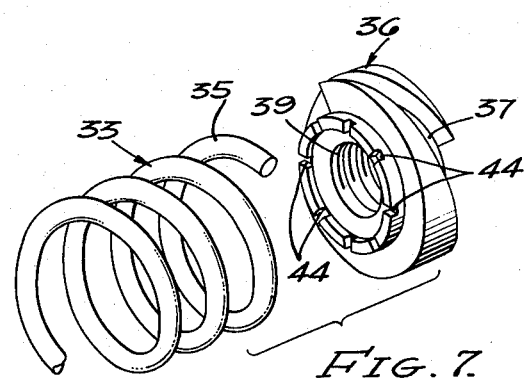

Figure 7 is a perspective view showing the manner of connecting the load spring to the nut which is threaded upon the driven shaft.

Referring to the drawings, a driven shaft 10 is mounted within a housing generally designated 11 and the projecting end of the shaft is provided with a hexagonal socket 12 for reception of a tool 13. This tool may take the form of a screw driver bit. A spring clip 14 on the shaft 10 acts on a ball 15 to move it into resilient contact with a groove (not shown) in the bit 13. The ball 15 is mounted in a lateral opening in the shaft 10.

The housing 11 comprises a barrel 16 connected to the end cap 17 by means of threads 18. A dimple plate assembly generally designated 20 is mounted within the cap 17 and encircles the shaft 10. This assembly includes a series of circumferentially spaced balls 21 mounted between confronting faces of dimple plates 22 and 23. The balls 21 are maintained in spaced relationship by means of apertures in a retainer ring 24. Each of the confronting faces of the dimple plates 22 and 23 is provided with a series of indented pockets or dimples 25. The forward dimple plate 22 is provided with a plurality of radially extending lugs 26 on its outer periphery and these lugs 26 are received within recesses 27 provided in the end cap 17. This construction allows limited rotational movement of the dimple plate 22 with respect to the end cap 17. The outer surface 28 of the dimple plate 22 has running clearance with the inner surface of the end cap 17. The surface 30 on the forward dimple plate 22 engages the radial shoulder 31 provided in the end cap 17.

The dimple plate 23 has a shoulder 32 engaged by one end of the load spring 33. The end of the spring which engages the dimple plate shoulder is flattened and ground as shown in 34, but the other end 35 of the load spring 33 is not flattened nor ground but remains in helical shape for assembly with the nut 36. The nut 36 is provided with a helical groove 37 on its outer periphery for reception of the end 35 of the load spring 33. A set screw 38 is provided for clamping the spring to the nut 36. The nut 36 is provided with internal threads 39 which engage external threads 40 provided on the shaft 10. A locking washer 41 serves to hold the nut 36 in adjusted position on the shaft 10. This locking washer 41 has an internal projection 42 which extends into the axial keyway 43 and also has a series of external projections which enter the radial slots 44 provided on the front face of nut 36. A light weight spring 45 encircles a portion of the shaft 10 one end of the spring bears against the locking washer 41 and the other end bears against the dimple plate 23.

Another spring 47 encircles a portion of the shaft 10 and extends between a shoulder 48 on the end cap 17 and the retainer ring 24. This is also a light weight spring and its purpose is to hold the retainer ring 24 lightly in engagement with the dimple plate 23 in order to prevent escape of the balls 50 upon axial separation of the dimple plates 22 and 23, as described below. The balls 50 are mounted in axially extending keyways 51 provided in the shaft 10, and also extend into keyways 52 provided in the dimple plate 23. The balls 50 serve to center the dimple plate 23 on the shaft 10 and to allow it to move axially with a minimum of friction.

Commercially obtainable load springs do not have identical deflection characteristics. The adjustable mounting provided by the nut 36 affords a means of compensating for the differences between individual load springs, when the torque limiter tool is manufactured on a quantity production basis. The required spring load is obtained by turning the nut 36 into the spring by means of helical groove 37 until the load spring 33 exerts a predetermined force for a given amount of compression. The set screw 38 then clamps the load spring to the nut. In this way, accuracy of the load settings of the torque limiter tools are not limited by variations in commercially available compression springs.

Means are provided for moving the shaft 10 axially of the housing to provide any desired torque release setting within the range of the tool. As shown in the drawings, this means includes a stationary sleeve 55 fixed within a bore 56 of the central internal boss 57 provided at one end of the barrel 16. This sleeve 55 has a hexagonal central opening 58 which extends therethrough. A drive post 59 which may be formed of hexagonal bar stock is slidably received within the opening 58 for movement axially of the housing 11. This drive post 59 has axially extending internal threads 60 which are engaged by external threads 61 on the adjusting screw 62. This adjusting screw 62 has an extension 63 which projects out of the barrel 16 through an opening 64. A ball bearing assembly 65 is interposed between the flange 66 on the adjusting screw and the shoulder 67 on the barrel 16.

A key or handle 68 is provided with inwardly directed trunnions 69 which fit into a transverse opening 70 in extension 63. In this way, the handle 68 is pivotally mounted on the adjusting screw 62. A washer 71 encircles the extension 63 and is adapted to contact a side face of the handle 68. A Belleville spring 72 is interposed between the washer 71 and the end surface 73 of the barrel 16. The handle 68 has a radial projection 74 which is adapted to be received in any one of a plurality of end slots 75 on the barrel 16. If desired, a locking screw 76 may be provided to secure the pivoted handle 68 in any one of its adjusted positions with respect to the barrel 16.

Rotation of the adjusting screw 62 by means of the pivoted handle 68 serves to move the drive post 59 axially of the housing 11. The end surface 78 on the drive post contacts the center ball 79 which is mounted to turn within bore 80 in the end of the shaft 10. A hardened steel pin 81 is mounted centrally on the shaft 10 and has a flat face 82 which contacts the ball 80. Axial movement of the drive post 59 in a direction toward the dimple plate assembly 20 acts through the ball 80 and pin 81 to move the shaft 10 in a direction to project it from the housing 11, thereby compressing the load spring 33.

A transparent sleeve 84 is supported by threads 85 and a set screw 86 at the forward end of the end cap 17. This transparent sleeve is provided with a central bulging portion 87 which acts as a lens to magnify the graduations and indicia 88 carried on the outer surface of the shaft 10. In the particular tool illustrated in the drawings, the indicia associated with the graduations show that the shaft may be adjusted to produce torque release settings from two inch pounds to 30 inch pounds. A scribe mark 89 within the bore of the sleeve 84 forms an index line for a reference. Turning of the adjusting screw 62 by means of the handle or key 68 serves to bring any one of the graduations 88 into alignment with the reference line 89, and the magnifying effect of the lens 87 serves to make a very precise adjustment easy to accomplish. The graduations 88 on the outer surface of the shaft 10 are not necessarily equally spaced although they produce equal increments in torque release settings. This unequal spacing arises from the fact that the relationship of axial movement and torque release characteristics of the dimple plate assembly and load spring are not precisely linear.

In operation, a screw driver or other bit 13 is mounted in the socket 12 at the forward end of the shaft 10. The torque release setting is adjusted by turning the key 68 to cause the shaft 10 to move axially with respect to the housing 11. When the reference or index line 89 registers with the particular graduation 88 on the shaft 10 corresponding to the desired load setting, the tool is ready for use. The housing 11 is grasped in the hand of the user and is turned in a direction to tighten the screw, not shown. When the desired torque value has been reached, the dimple plate 23 moves rearward against the action of the load spring 33 as the balls 21 roll out of the confronting indentations 25. The balls 21 continue to roll into and out of the indentations 25 in a sort of ratcheting action so long as the handle 11 is turned, after the desired torque value has been reached. The tool may then be withdrawn from the screw.

When the selected torque release value lies at or near the low end of the range, the effective length of the load spring 33 may be less than the axial distance from the shoulder 32 and the abutment provided by the nut 36. The light spring 45 then offers the only resistance to initial movement of the dimple plate 23 axially away from the dimple plate 22. Before the full separation occurs, however, the load spring 33 is contacted and final separating movement occurs against the action of this spring 33. The dimple plate 22 is given limited rotational freedom within the housing 11 so that under all loading conditions, including those for low torque release values, reverse torque action does not adversely affect the torque load setting when the balls 21 re-enter the dimples 25.

In conventional adjustable torque tools, a system of linear graduations in combination with peripheral graduations on the housing does not permit unequal spacing of the graduation marks, with the result that a rather wide tolerance is necessary on the accuracy of the calibration. In the present tool constructed in accordance with my invention, however, the torque release graduation marks are axially spaced upon the shaft itself. By this means I am able to locate the graduations to suit the characteristics of the load spring and the torque release mechanism, so that the torque release settings of the tool are very accurate throughout the entire graduated range.

Having fully described my invention, it is to be understood that I do not wish to be limited to the details herein set forth, but my invention is of the full scope of the appended claims.

I claim:

1. A torque limiting tool comprising in combination: a housing, a shaft mounted centrally within the housing and extending from one end thereof, a torque limiting assembly mounted within the housing and encircling a portion of the shaft, said assembly including a pair of dimple plates having a plurality of balls interposed therebetween, a nut threaded on the shaft within the housing, a helical load spring interposed between the torque limiting means and the nut, means including a helical groove on the nut receiving a helical portion of the load spring for adjusting the position of the nut with respect to the load spring, and means in the housing for adjusting the axial position of the shaft and thereby changing the compression of the load spring.

2. A torque limiting tool comprising in combination: a housing, a shaft mounted centrally within the housing and extending from one end thereof, a torque limiting assembly mounted within the housing and encircling a portion of the shaft, said assembly including a forward dimple plate mounted in the housing and a rear dimple plate keyed for axial sliding movement on the shaft, the dimple plates having confronting faces provided with indentations, a plurality of balls interposed between the confronting faces and adapted to be received within said indentations, a nut threaded on the shaft within the housing, a helical load spring interposed between the second dimple plate and the nut, means including a helical groove on the nut receiving a helical portion of the load spring for adjusting the position of the nut with respect to the load spring, and means in the housing for adjusting the axial position of the shaft and thereby changing the compression of the load spring.

3. A torque limiting tool comprising in combination: a housing, a shaft mounted centrally within the housing and extending from one end thereof, a torque limiting assembly mounted within the housing and encircling a portion of the shaft, said assembly including a pair of dimple plates having confronting faces provided with indentations, and a plurality of balls interposed between the confronting faces and adapted to be received within said indentations, a nut threaded on the shaft within the housing, a load spring interposed between the second dimple plate and the nut, the shaft having axially spaced graduations thereon corresponding to torque-release settings, means on the housing providing an index line for registration with said graduations, and means in the housing for adjusting the axial position of the shaft and thereby changing the compression of the load spring.

4. The combination set forth in claim 3 wherein the index line is provided within a transparent bulbous member mounted upon the housing and acting as a lens to magnify the graduations upon the shaft.

5. A torque limiting tool comprising in combination: a housing, a shaft mounted centrally within the housing and extending from one end thereof, a torque limiting assembly mounted within the housing and encircling a portion of the shaft, said assembly including a forward dimple plate mounted in the housing for limited rotational movement relative thereto and a rear dimple plate keyed for axial movement on the shaft, the dimple plates having confronting faces provided with indentations, a plurality of balls interposed between the confronting faces and adapted to be received within said indentations, a nut threaded on the shaft within the housing, a load spring interposed between the second dimple plate and the nut, means in the housing for adjusting the axial position of the shaft for changing the compression of the load spring, whereby upon turning of the housing relative to the shaft, the second dimple plate is moved axially by the balls away from the first dimple plate against the action of the load spring when the torque transmitted between the dimple plates reaches a predetermined magnitude.

6. A torque limiting tool comprising in combination: a housing, a shaft mounted centrally within the housing and extending from one end thereof, a torque limiting assembly mounted within the housing and encircling a portion of the shaft, said assembly including a pair of opposed dimple plates, separated by a plurality of balls interposed therebetween, means on the shaft within the housing forming an abutment, a load spring interposed between the torque limiting assembly and the abutment, means in the housing for adjusting the axial position of the shaft for changing the compression of the load spring, said means including an adjusting screw rotatably mounted in the housing, an internally threaded element engaged by the adjusting screw and guided for axial sliding movement within the housing, and a ball interposed between said element and the end of the shaft.

7. The combination set forth in claim 6 wherein a portion of the adjusting screw projects out of the housing and is provided with a pivoted key for manually turning the adjusting screw, and means for locking the key in selected positions relative to the housing.

References Cited in the file of this patent

UNITED STATES PATENTS

| | | |
|---|---|---|
| 1,881,633 | Johnson | Oct. 11, 1932 |
| 2,396,040 | Darling | Mar. 5, 1946 |
| 2,472,659 | Greer | June 7, 1949 |
| 2,686,446 | Livermont | Aug. 17, 1954 |
| 2,704,472 | Booth | Mar. 22, 1955 |
| 2,732,746 | Livermont | Jan. 31, 1956 |
| 2,857,793 | Peras | Oct. 28, 1958 |

FOREIGN PATENTS

| | | |
|---|---|---|
| 846,203 | France | May 27, 1939 |